United States Patent
Asatani et al.

(10) Patent No.: US 6,445,551 B1
(45) Date of Patent: Sep. 3, 2002

(54) BAR-SHAPED HEAD AGGREGATION, A THIN FILM MAGNETIC HEAD, A MAGNETIC HEAD DEVICE AND A MAGNETIC DISK DRIVING DEVICE

(75) Inventors: Takashi Asatani; Fujimi Kimura; Junichi Sato, all of Tokyo (JP)

(73) Assignee: TDK Corporation, Tokyo (JP)

( * ) Notice: Subject to any disclaimer, the term of this patent is extended or adjusted under 35 U.S.C. 154(b) by 106 days.

(21) Appl. No.: 09/610,289

(22) Filed: Jul. 5, 2000

(30) Foreign Application Priority Data

Jul. 14, 1999 (JP) .......................... 11-199900
May 31, 2000 (JP) ....................... 2000-163069

(51) Int. Cl.⁷ ............................................. G11B 5/39
(52) U.S. Cl. ..................................................... 360/317
(58) Field of Search ................................. 360/317, 318, 360/318.1, 319, 322, 122, 128, 313, 324, 324.1; 324/252; 338/32 R

(56) References Cited

U.S. PATENT DOCUMENTS

| | | | | |
|---|---|---|---|---|
| 5,729,409 A | * | 3/1998 | Ohashi et al. ............... | 360/113 |
| 5,812,349 A | * | 9/1998 | Shouji et al. ................ | 360/110 |
| 5,850,325 A | * | 12/1998 | Miyauchi et al. ........... | 360/113 |
| 5,872,691 A | * | 2/1999 | Fukuyama et al. ......... | 360/113 |
| 5,936,812 A | * | 8/1999 | Terunuma et al. .......... | 360/113 |
| 5,978,176 A | * | 11/1999 | Ezaki et al. ................. | 360/103 |
| 5,995,343 A | * | 11/1999 | Imamura ..................... | 360/126 |
| 6,047,462 A | * | 4/2000 | Miyauchi et al. ......... | 29/603.14 |
| 6,078,484 A | * | 6/2000 | Sakakima .................... | 360/324 |
| 6,084,752 A | * | 7/2000 | Sakakima et al. .......... | 360/113 |
| 6,198,600 B1 | * | 3/2001 | Kitao et al. ............... | 360/235.2 |

FOREIGN PATENT DOCUMENTS

JP     A 8 293108     11/1996

* cited by examiner

Primary Examiner—Allen Cao
Assistant Examiner—Dzung C. Nguyen
(74) Attorney, Agent, or Firm—Oliff & Berridge, PLC

(57) ABSTRACT

A first insulating film is provided on a first shielding film. A magnetoresistive effective element is provided on the first insulating film. A first and a second leading conductor films are provided on the first insulating film and connected to both ends of the magnetoresistive effective element. A second insulating film covers the first and second leading conductor films and the magnetoresistive effective element, and a second shielding film is provided on the second insulating film. A terminal conductor for measurement is conductively connected to at least one of the first and the second shielding films, and exposed to a different surface of a slider from a medium opposing surface thereof.

23 Claims, 10 Drawing Sheets

BAR-SHAPED HEAD AGGREGATION, A THIN FILM MAGNETIC HEAD, A MAGNETIC HEAD DEVICE AND A MAGNETIC DISK DRIVING DEVICE

BACKGROUND OF THE INVENTION

1) Field of the Invention

This invention relates to a bar-shaped head aggregation, a thin film magnetic head, a magnetic head device and a magnetic disk driving device 2) Related Art Statement In manufacturing of a thin film magnetic head, thin film elements are formed on a wafer, and thereafter, the wafer is cut out to form bar-shaped head aggregations. Each bar-shaped head has aligned plural magnetic head elements. The bar-shaped head aggregation is processed to have its required geometrical shape on its medium opposing surface, and is lapping-processed. Then, it is cut out to each thin film magnetic head element to obtain thin film magnetic heads.

In a bar-shaped head aggregation or a thin film magnetic head which employs, as a reading element, a magnetic resistive effective element such as a magnetic anisotropic resistive effective element, a giant magnetic resistive effective element having a spin valve film or a perovskite type magnetic substance or a ferromagnetic tunnel junction effective element, the magnetic resistive effective element and its leading conductive films are embedded in an insulating film made of alumina, etc. Then, a first and a second shielding films are provided on and under the insulating film, respectively.

In the above bar-shaped head aggregation or thin film magnetic head, if the insulating film, which is located between the leading conductive film and either the first or the second shielding films, is degraded or brought down in its insulation, it may have larger electric noises or less electromagnetic conversion characteristics.

For distinguishing defective thin film magnetic head elements or thin film magnetic heads, such a thin film magnetic head or a bar-shaped head aggregation is required to be examined in its electrical insulation. In a conventional examination for the electrical insulation, the bar-shaped head aggregation and the thin film magnetic head are examined by contacting a probe to the end surface of the first or second shielding film on an air bearing surface of a slider and the terminal conductor of the leading conductive film on the end surface of the slider in the air outflow side.

However, since the shielding film is extremely thin, it is very difficult to contact the probe to the end surface of the shielding film.

Moreover, it is not easy to determine and position in the examination direction two different surfaces of the minute thin film magnetic head element or the thin film magnetic head. Then, it is extremely difficult to contact the probe to the two surface after the positioning.

Since the exposed end surface to the air bearing surface of the shielding film is located near the exposed end surface thereto of the magnetic resistive effective element, the probe to be contacted to the exposed end surface of the shielding film may be contacted to the exposed end of the magnetic resistive effective element by mistake, so that the magnetic resistive effective element may be damaged.

Moreover, the air bearing surface which is required to have a highly smooth surface of submicron-order or below roughness may have scratches by the probe, so that the floating performance of the thin film magnetic head element or the thin film magnetic head may be deteriorated.

Kokai Publication Kokai Hei 8-293018 (JP A 8-293018) discloses that during a wafer processing, the leading conductive film and the shielding film are kept to be electrically connected, and after the wafer processing, they are shut down electrically.

However, this document discloses only to prevent the dielectric degradation and the dielectric destruction of the insulating film during the wafer processing, and even in the disclosed technique, the above examination means is required to examine the electrical insulation of the insulating film between the shielding films in the thin film magnetic head and the bar-shaped head aggregation.

SUMMARY OF THE INVENTION

It is an object of the present invention to provide a bar-shaped head aggregation, a thin film magnetic head, a magnetic head device with the thin film magnetic head and a magnetic disk driving device in which an electrical insulation of an insulating film, between shielding films, with an embedded magnetoresistive effective element film can be easily examined.

It is another object of the present invention to provide a bar-shaped head aggregation, a thin film magnetic head, a magnetic head device with the thin film magnetic head and a magnetic disk driving device in which shielding films, a magnetoresistive effective element and an air bearing surface can not be damaged in the electrical insulation measurement for the insulating film, between the shielding films, with the embedded magnetoresistive effective element.

It is further object of the present invention to provide a bar-shaped head aggregation, a thin film magnetic head, a magnetic head device with the thin film magnetic head and a magnetic disk driving device in which an insulating film is prevented from being electrically damaged in processes except the electrical insulation measurement thereof.

It is still further object of the present invention to provide a bar-shaped head aggregation, a thin film magnetic head, a magnetic head device with the thin film magnetic head and a magnetic disk driving device in which a means to prevent the electrical damage for an insulating film can be easily removed in the electrical insulation measurement thereof.

For achieving the above objects, in the bar-shaped head aggregation of the present invention with an aligned plural thin film magnetic head elements, each thin film magnetic head element has at least one electromagnetic conversion element.

The electromagnetic conversion element includes a first shielding film, a first insulating film, a magnetoresistive effective element, a first leading conductor film, a second leading conductor film, a second insulating film, a second shielding film, a first terminal conductor for the first leading conductor film, a second terminal conductor for the second leading conductor film and a terminal conductor for measurement.

The first insulating film is provided on the first shielding film. The magnetoresistive effective element is provided on the first insulating film. The first leading conductor film is formed on the first insulating film and connected to one end of the magnetoresistive effective element. The second leading conductor film is provided on the first insulating film and connected to the other end of the magnetoresistive effective element.

The first terminal conductor is connected to the first leading conductor film and exposed to a different surface of a slider from a medium opposing surface thereof. The second terminal conductor is connected to the second leading conductor film and exposed to a different surface of the slider from the medium opposing surface thereof.

The second insulating film covers the first and the second leading conductor films and the magnetoresistive effective element. The second shielding film is provided on the second insulating film.

The terminal conductor for measurement is conductively connected to at least one of the first and the second shielding films and is exposed to a different surface of the slider from the medium opposing surface thereof.

As mentioned above, since the magnetoresistive effective element, the first and second leading conductor films are provided on the insulating film formed on the first shielding film, they are shielded by and electrically insulated from the first shielding film.

Since the first and second leading conductor films and the magnetoresistive effective element are covered with the second insulating film under the second shielding film, they are shielded by and electrically insulated from the second shielding film.

The measuring terminal conductor is conductively connected to at least one of the first and the second shielding films. That is, the measuring terminal conductor is conductively connected to only either or both of the first and the second shielding film. In the above bar-shaped head aggregation, by contacting a probe to the measuring terminal conductor and the first or the second terminal conductor connected to the first or the second leading conductor films, the first or the second insulating film, which is located between the first insulating film and the first leading conductor film or between the second leading conductor film and the second shielding film, can be examined in its electrical insulation.

Since the measuring terminal conductor is exposed to a surface of the slider composed of a substrate, it can have a flat surface enough for the probe to be contacted.

Moreover, the exposed surface of the measuring terminal conductor is different from the medium opposing surface of the slider, the accident of contacting the probe to the end of the shielding film or the magnetoresistive effective element can be avoided in the electrical insulation measurement.

Moreover, the measuring terminal conductor is provided on the different surface of the slider from the medium opposing surface including the air bearing surface thereof, the air bearing surface is not damaged in the electrical insulation measurement.

Furthermore, a conductive film with appropriate resistivity and thickness can be applied between the measuring terminal conductor and the first and second terminal conductors (bumps), and thereby, the electric damage for the insulating film can be avoided. The conductive film has to be removed in the electrical insulation measurement for the insulating film. The conductive film may be made of a well known material which can be removed by an organic solvent. As a result, the conductive film can be easily removed in the electrical insulation measurement for the first and second insulating films.

The thin film magnetic head of the present invention can be obtained by cutting out such a bar-shaped head aggregation into each thin film magnetic head element. The obtained thin film magnetic head includes a slider and at least one electromagnetic conversion element.

The electromagnetic conversion element has a first shielding film, a first insulating film, a magnetoresistive effective element, a first leading conductor film, a second leading conductor film, a second insulating film, a second shielding film, a first terminal conductor for the first leading conductor film, a second terminal conductor for the second leading conductor film and a terminal conductor for measurement. The first insulating film is provided on the first shielding film. The magnetoresistive effective element is provided on the first insulating film.

The first leading conductor film is provided on the first insulating film and connected to one end of the magnetoresistive effective effect. The second leading conductor film is provided on the first insulating film and connected to the other end of the magnetoresistive effective effect. The first terminal conductor is connected to the first leading conductor film and exposed to a different surface of the slider from the medium opposing surface thereof. The second terminal conductor is connected to the second leading conductor film and exposed to a different surface of the slider from the medium opposing surface thereof.

The first leading conductor film, the second leading conductor film and the magnetoresistive effective element are covered with the second insulating film. The second shielding film is provided on the second insulating film. The terminal conductor for measurement is conductively connected to at least one of the first and the second shielding films and exposed to a different surface of the slider from the medium opposing surface thereof.

As mentioned above, the thin film magnetic head can be obtained from the bar-shaped head aggregation, and thus, can exhibit similar effects.

The other objects, configurations and advantages will be explained in detail, with reference to the attaching drawings in embodiments.

BRIEF DESCRIPTION OF THE DRAWINGS

For a better understanding of this invention, reference is made to the attached drawings, wherein.

BRIEF DESCRIPTION OF PREFERRED EMBODIMENTS

Figure 1:
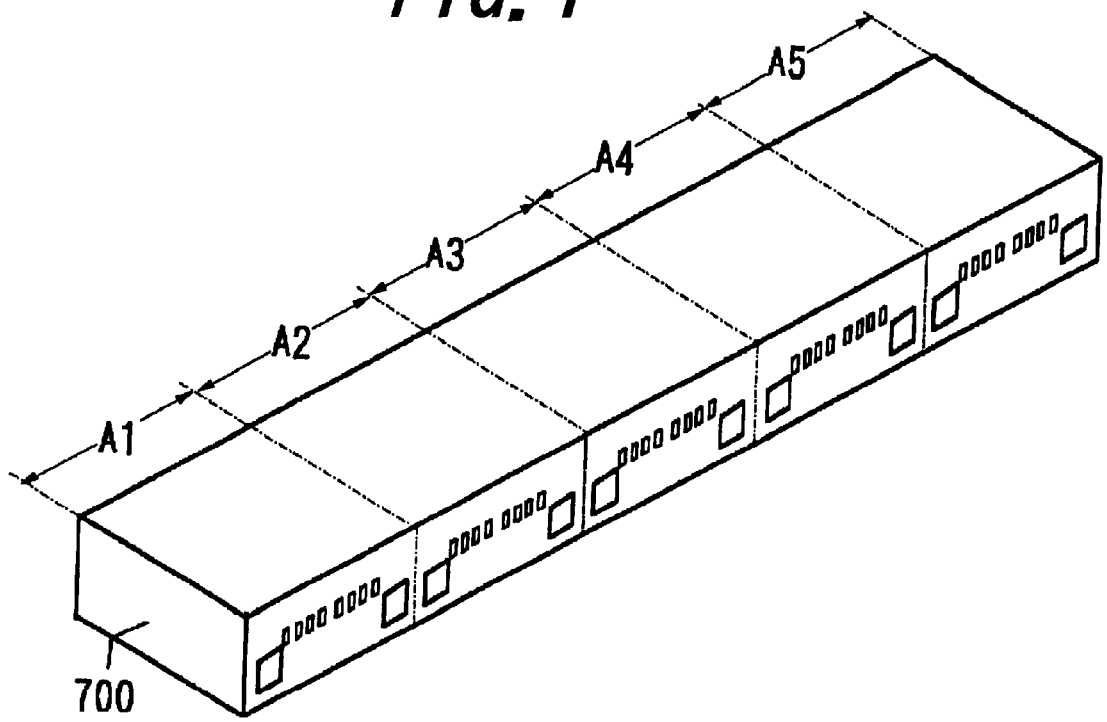
FIG. 1 is a perspective view showing an example in the bar-shaped head aggregation of the present invention.

FIG. 1 is a perspective view showing an example in the bar-shaped head aggregation of the present invention. The illustrated bar-shaped head aggregation is obtained by cutting out a wafer. The bar-shaped head aggregation has aligned five thin film magnetic head elements A1 to A5. The number of the thin film magnetic head element is not limited, but usually not less than five.

Figure 2:
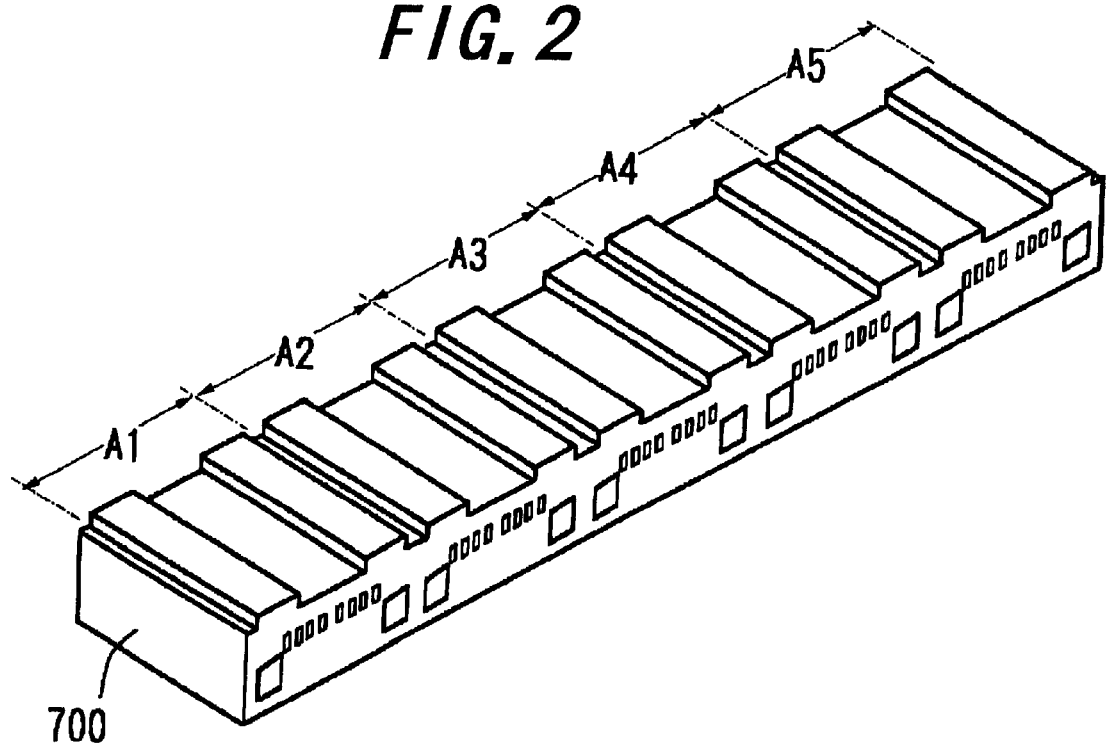
FIG. 2 is a perspective view showing another example in the bar-shaped head aggregation of the present invention.

FIG. 2 is a perspective view showing another example in the bar-shaped head aggregation of the present invention. The illustrated bar-shaped head aggregation is obtained by additionally processing the one shown in FIG. 1. Concretely, the bar-shaped head aggregation shown in FIG. 1 is processed so that its medium opposing surface can have a geometrical shape, and thereafter, lapping-processed.

Figure 3:
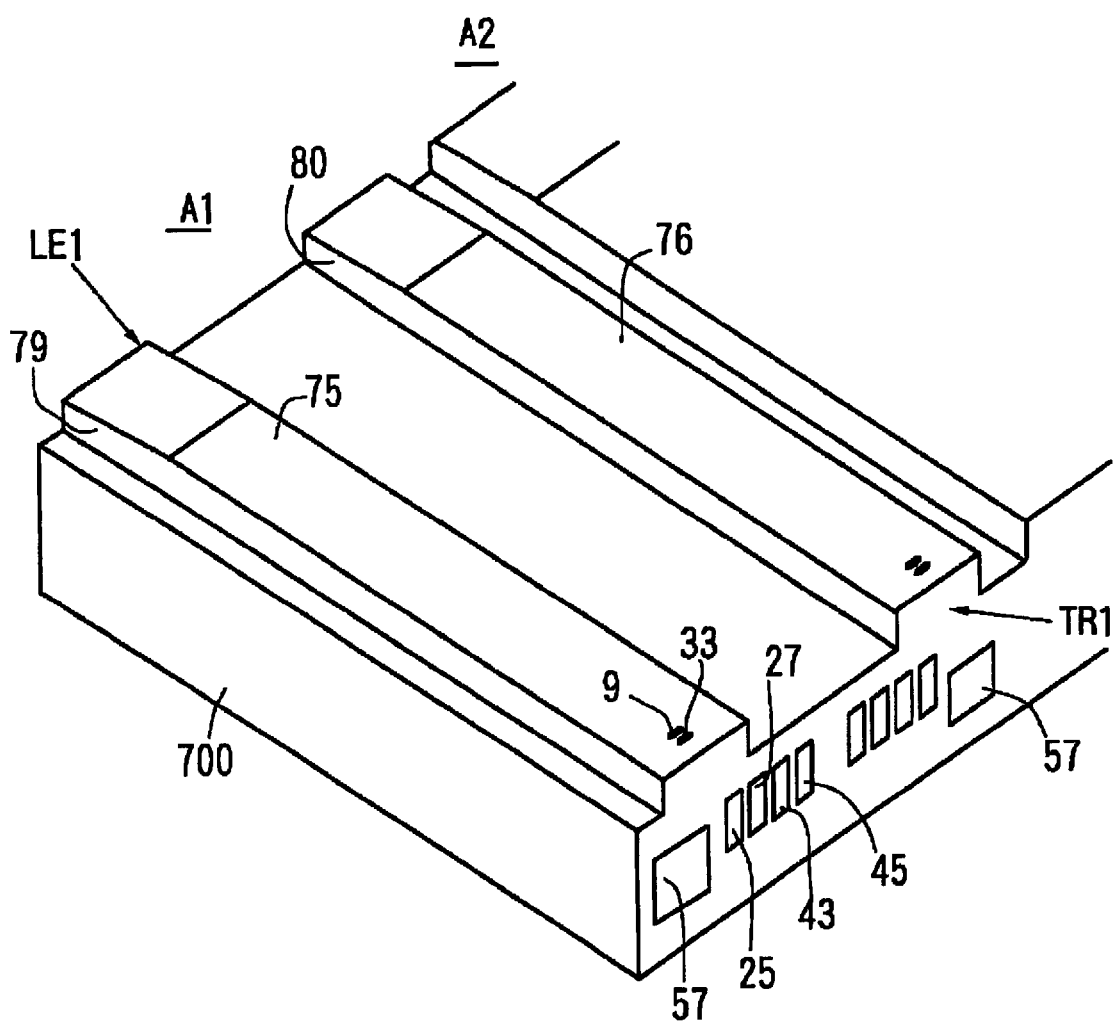
FIG. 3 is an enlarged perspective view showing a part of the bar-shaped head aggregation shown in FIG. 2.

FIG. 3 is an enlarged perspective view showing a part of the bar-shaped head aggregation shown in FIG. 2. In the illustrated bar-shaped head aggregation, the thin film magnetic head element A1 has a substrate 700 to constitute a slider and two magnetoresistive effective element 9. In this example, the thin film magnetic head element A1 has two inductive type electromagnetic conversion elements 33 as writing elements in addition to the two magnetoresistive effective elements 9 as reading elements.

The substrate 700 has rail parts 79 and 80 on its medium opposing surface, and the surfaces of the rail parts 79 and 80 are employed as air bearing surfaces 75 and 76. The substrate is not required to have the two rail parts 79 and 80. For example, it may have one to three rail parts or a flat surface without the rail. For improving its floating performance, the substrate may have the air bearing surfaces 75 and 76 with geometrical shapes. This invention can be applied for any kind of substrate.

The inductive type electromagnetic conversion elements 33 and the magnetoresistive effective elements 9 are provided on the end surfaces of the rail parts 79 and 80 in an air outflow side TR1. An air inflow side LE is located in the opposite side to the air outflow side TR1. Although in this example, the two inductive type electromagnetic conversion elements 33 and the two magnetoresistive effective elements 9 are provided on both of the rail parts 79 and 80, the single inductive type electromagnetic conversion element 33 and the single magnetoresistive effective element 9 may be provided on one of the rail parts 79 and 80. On the air outflow side TR1 are provided terminal conductors 43 and 45 (bumps)for the inductive type electromagnetic conversion elements 33, terminal conductors 25 and 27 (bumps)for the magnetoresistive effective elements 9 and terminal conductors 57 for measurement.

Figure 4:
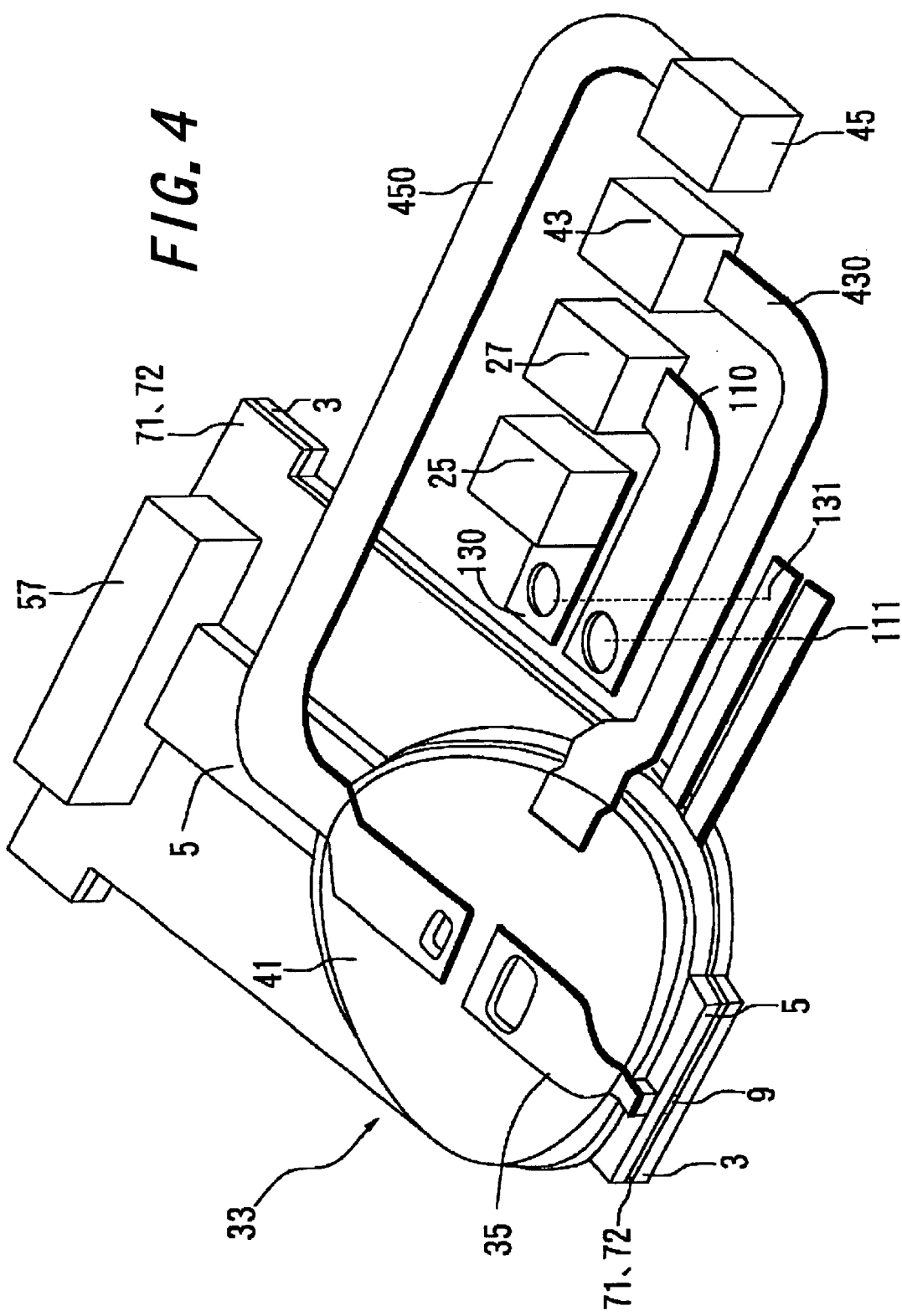
FIG. 4 is a perspective view showing the magnetic conversion element structure included in each thin film magnetic head element in the bar-shaped head aggregation shown in FIGS. 1 and 2.
Figure 5:
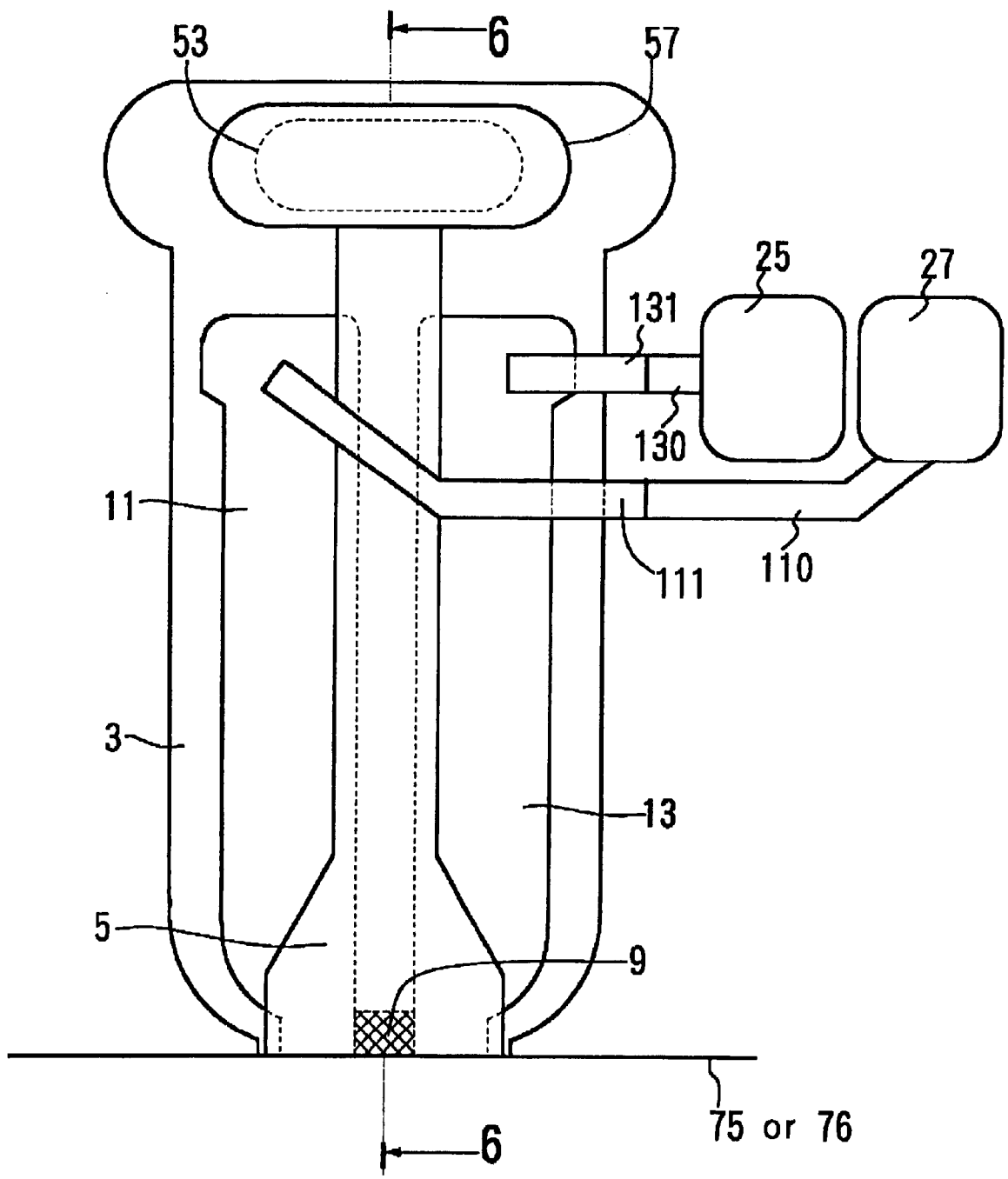
FIG. 5 is a plan view schematically showing the conductive part of the magnetic conversion element structure without the inductive type electromagnetic conversion element shown in FIG. 4.
Figure 6:
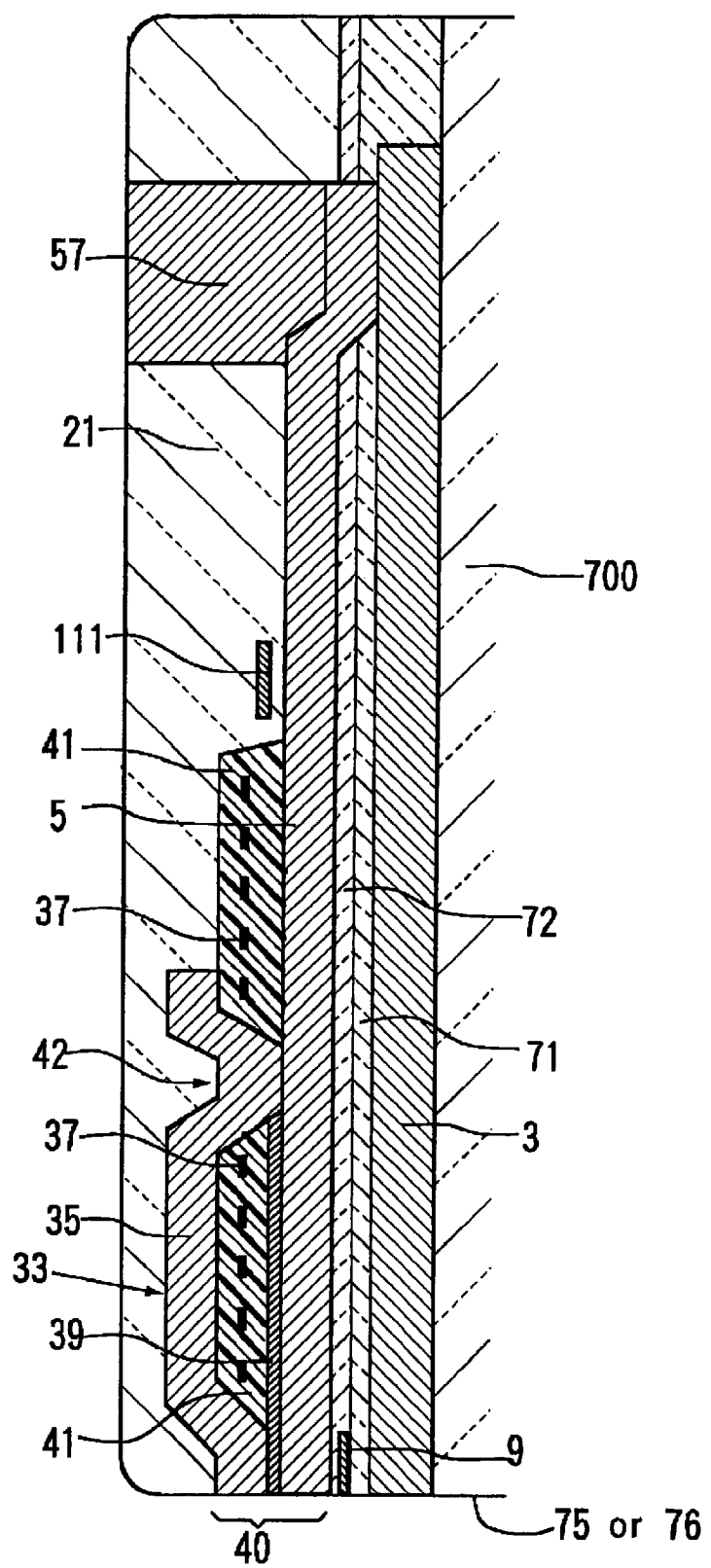
FIG. 6 is a cross sectional view, taken on line "6—6" of FIG. 4.

FIG. 4 is a perspective view showing the magnetic conversion element structure included in each of the thin film magnetic head elements A1 to A5 in the bar-shaped head aggregation shown in FIGS. 1 and 2. FIG. 5 is a plan view schematically showing the conductive part of the magnetic conversion element structure without the inductive type electromagnetic conversion element 33 shown in FIG. 4. FIG. 6 is a cross sectional view, taken on line "6—6". Each part in these figures is exaggerated.

Referring to FIGS. 5 and 6, in the bar-shaped head aggregation of the present invention, each of the thin film magnetic head elements has a first shielding film 3, a first insulating film 71, a first leading conductor film 11, a second leading conductor film 13, a second insulating film 72, a second shielding film 5 and terminal conductor 57 for measurement. The first shielding film 3 is formed, of a well known material, in a well known thickness on the substrate 700 as the slider. The shielding film 3 is made of permalloy etc.

The first insulating film 71 is formed, of alumina, etc., on the first shielding film 3. Its thickness is much thinner than the first shielding film 3.

The magnetoresistive effective element 9 is provided on the first insulating film 71. It may be composed of a giant magnetoresistive effective element having a magnetic anisotropic resistive effective film, a spin valve film or a perovskite type magnetic substance or a ferromagnetic tunnel junction effective element, etc.

The first and second leading conductor films 11 and 13 are provided on the first insulating film 71 and connected to both ends of the magnetoresistive effective element 9. The film structures and the material of the first and the second leading conductor films 11 and 13 are selected depending on the kind of the magnetoresistive effective element 9 such as the giant magnetoresistive effective element or the ferromagnetic tunnel junction effective element. The first leading conductor film 11 is extended backward from the air bearing surfaces, and connected to the terminal conductor 27 via leading conductors 110 and 111. The second leading conductor film 13 is extended backward from the air bearing surfaces 75 and 76, and connected to a terminal conductor 25 via leading conductors 130 and 131.

The first leading conductor film 11, the second leading conductor film 13 and the magnetoresistive effective element 9 are covered with the second insulating film 72. The similar material and thickness to the ones of the first insulating film 71 are selected for the second insulating film 72. Generally, as well as the first insulating film 71, the second insulating film 72 is formed of alumina in a much smaller thickness than the first shielding film 3.

The second shielding film 5 is provided on the second insulating film 72. The similar material and thickness to the ones of the first shielding film 3 are employed for the second shielding film 5.

The terminal conductor 57 is conductively connected to at least one of the first and the second shielding films 3 and 5. That is, the terminal conductor 57 is conductively connected to only either or both of the first and the second shielding films 3 and 5. In this example, the first and the second shielding films 3 and 5 are joined backward from the air bearing surfaces 75 and 76, and the terminal conductor 57 is provided on the backward joined portion thereof. The terminal conductor 57 is exposed to a different surface of the slider from the medium opposing surface of thereof. Although in this example, the terminal conductor 57 is exposed to the surface of the slider in the air outflow side TR1, it may be exposed to another surface thereof, for example, the opposite surface to the medium opposing surface or both surfaces. Naturally, since the thin film magnetic head has a protection film 21 made of alumina to cover the magnetic conversion element area, the terminal conductor 57 is formed so as to be exposed to the surface through the protection film 21. The terminal conductor 57 may be made of Cu-based metal, and preferably, has a Au film on its surface to prevent corrosion. The Cu-based metal means a Cu-series metal and an alloy including Cu.

As mentioned above, since the magnetoresistive element 9, the first leading conductor film 11 and the second leading conductor film 13 are provided on the first insulating film 71 formed on the first shielding film 3, they are shielded by and electrically insulated from the first shielding film 3.

The first leading conductor film 11, the second leading conductor film 13 and the magnetoresistive effective element 9 are covered with the second insulating film 72 under the second shielding film 5, they are shielded by and electrically insulated from the second shielding film 5.

The terminal conductor for measurement 57 is conductively connected to at least one of the first and the second shielding films 3 and 5. Therefore, by contacting the probe to the measuring terminal conductor 57 and the terminal conductor 27 of the first leading conductor film 11 or the terminal conductor 25 of the second leading conductor film 13, the electrical insulation of the first insulating film 71 between the first shielding film 3 and the first leading conductor film 11 or the second leading conductor film 13 or of the second insulating film 72 between the second shielding film 5 and the first leading conductor film 11 or the second leading conductor film 13 can be examined.

Since the terminal conductor 57 is exposed to the surface of the slider composed of the substrate 700, the thin film magnetic head element can have an enough flat surface enough for the measurement using the probe, so that the probe can be easily contacted to the thin film magnetic head element.

Moreover, since the terminal conductor 57 is exposed to the different surface of the slider from the medium opposing surface thereof, the accident of contacting the probe to the exposed end of the first shielding film 3, the second shielding film 5 or the magnetoresistive effective element 9 to the air bearing surfaces 75 and 76 of the slider can be prevented perfectly in the electrical insulation measurement.

The air bearing surfaces 75 and 76 are required to have highly flat surfaces with submicron order or below surface roughness. According to the present invention, since the terminal conductor 57 is provided on the different surface of the slider from the air bearing surfaces 75 and 76 thereof, the air bearing surfaces 75 and 76 is unlikely to be damaged by the probe in the electrical insulation measurement. Therefore, the floating performance of the thin film magnetic head element can not be deteriorated.

In this example, since the measuring terminal conductor 57 is exposed to the surface of the slider in the air outflow side TR1 on which the terminal conductors 25 and 27 for the magnetoresistive effective element 9 are provided, the probe can be easily contacted to the measuring terminal conductor 57 and the terminal conductor 25 or 27 on the surface of the slider in the air outflow side TR1, so that the electrical insulation measurement can be easily carried out.

In this example, the thin film magnetic head element A1 has the inductive type electromagnetic conversion elements 33 with a well known film structure for the writing elements. Typically, the inductive type electromagnetic conversion element has a first magnetic film composed of the second shielding film 5, a second magnetic film 35 to complete a magnetic circuit with the first magnetic film, a coil film 37, a gap film 39 made of alumina, etc., and an insulating film 41 made of an organic resin. The forefronts of the first and the second magnetic films 5 and 35, which are opposed each other via the gap film 39 with a minute thickness, constitute a pole portion 40 for writing.

The yoke portions of the first and the second magnetic films 5 and 35 are joined at a back gap portion 42 located backward from the pole portion 40 so as to complete the magnetic circuit. The coil film 37 is formed on the insulating film 41 so as to wind spirally around the joined portion of the yoke portions. Both ends of the coil film 37 are conductively connected to the terminal conductors 43 and 45. In this example, although the first magnetic film doubles as the second shielding film 5, it may be formed independently. Moreover, in this example, although the inductive type electromagnetic conversion element 33 is provided on the magnetoresistive effective element 9, it may be formed under the element 9.

Figure 7:
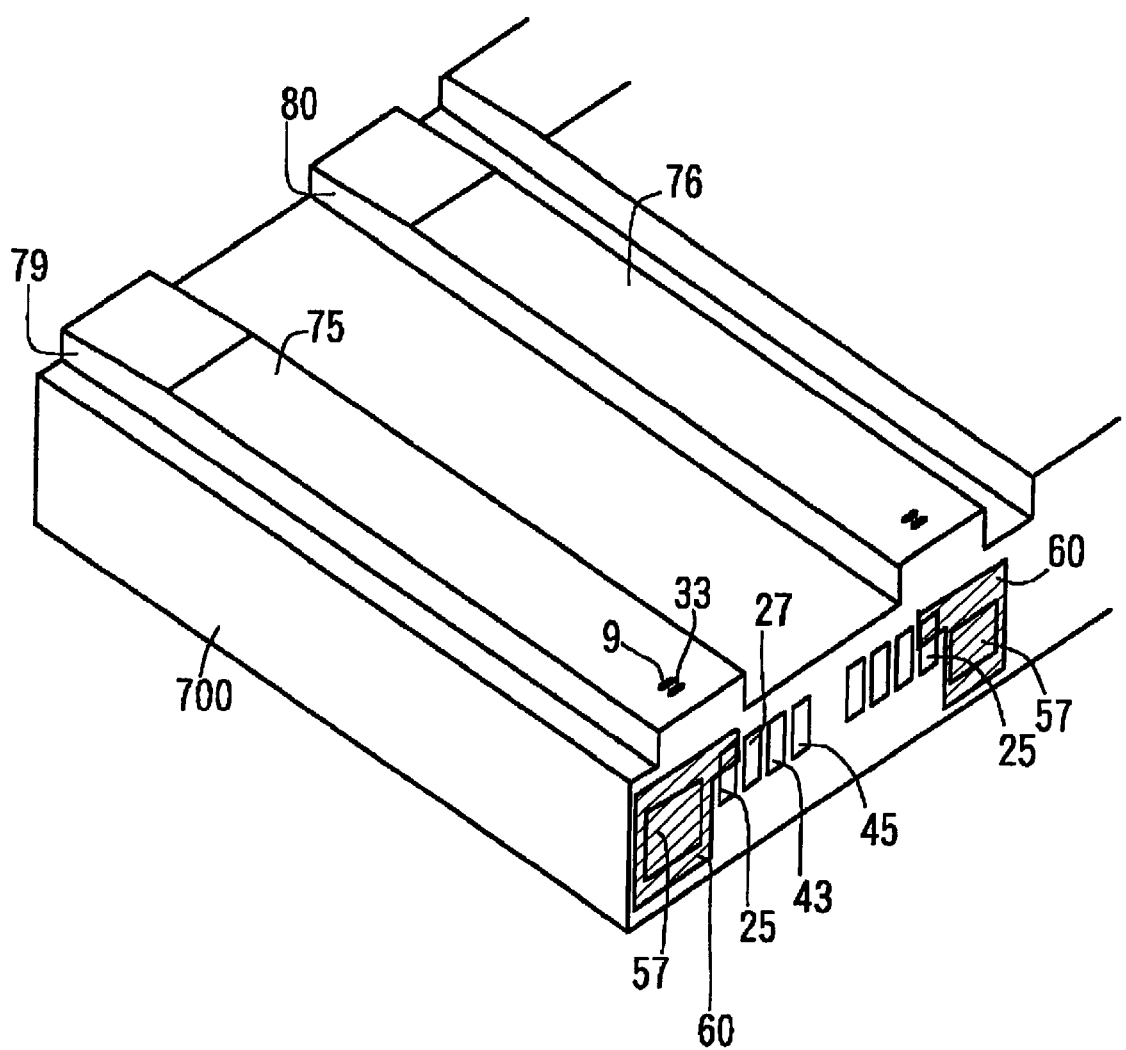
FIG. 7 is an enlarged perspective view showing a part of still another bar-shaped head aggregation according to the present invention.

FIG. 7 is an enlarged perspective view showing a part of another bar-shaped head aggregation of the present invention. In this example, conductive films 60 to electrically connect the measuring terminal conductors 57 and the terminal conductors 25, respectively, are applied on the surface of the slider to which the terminal conductors 25 connected to the leading conductor film 13 for the magnetoresistive effective element 9 and the measuring terminal conductors 57 are exposed. In this example, since the first shielding film 3 and the second shielding film 5 conductively connected to the measuring terminal conductor 57 can be kept to the same electric potential as that of the leading conductor film 13 connected to the terminal conductor 25, the first insulating film 71 and the second insulating film 72 are prevented from being electrically damaged in a lapping process, etc. The lapping process includes a polishing step for the substrate 700 as the slider to complete the air bearing surfaces 75 and 76. After the polishing step, the Throat Height TH and the MR strip width are defined. Moreover, because of the same electric potential, even in an ion beam-etching process and a film-forming process of a DLC protection film, the first insulating film 71 or the second insulating film 72 are prevented from being electrically damaged.

In FIG. 7, the parts of the terminal conductors 25 are exposed from the conductive films 60, respectively. Therefore, the probe can be directly contacted or bonded to the exposed part of the terminal conductor 25.

After setting the probe to the terminal conductor 25, the conductive films 60 has to be removed in the electrical insulation measurement for the first insulating film 71 and the second insulating film 72. The conductive films 60 may be made of a well known soluble material for an organic solvent, for example, a paint composed of a conductive component, an organic vehicle and a solvent. Therefore, in this case, the conductive films 60 can be easily removed in the electrical insulation measurement for the first and the second insulating films 71 and 72.

It is also desired that each conductive film 60 has a resistivity and thickness which do not influence the detection of the polished amount in the polish amount detection by a resistance measuring method in the lapping process. Moreover, each conductive film 60 is patterned so that a pair of terminals connected to a resistive element to be used in the polish amount detection may not be contacted each other.

Figure 8:
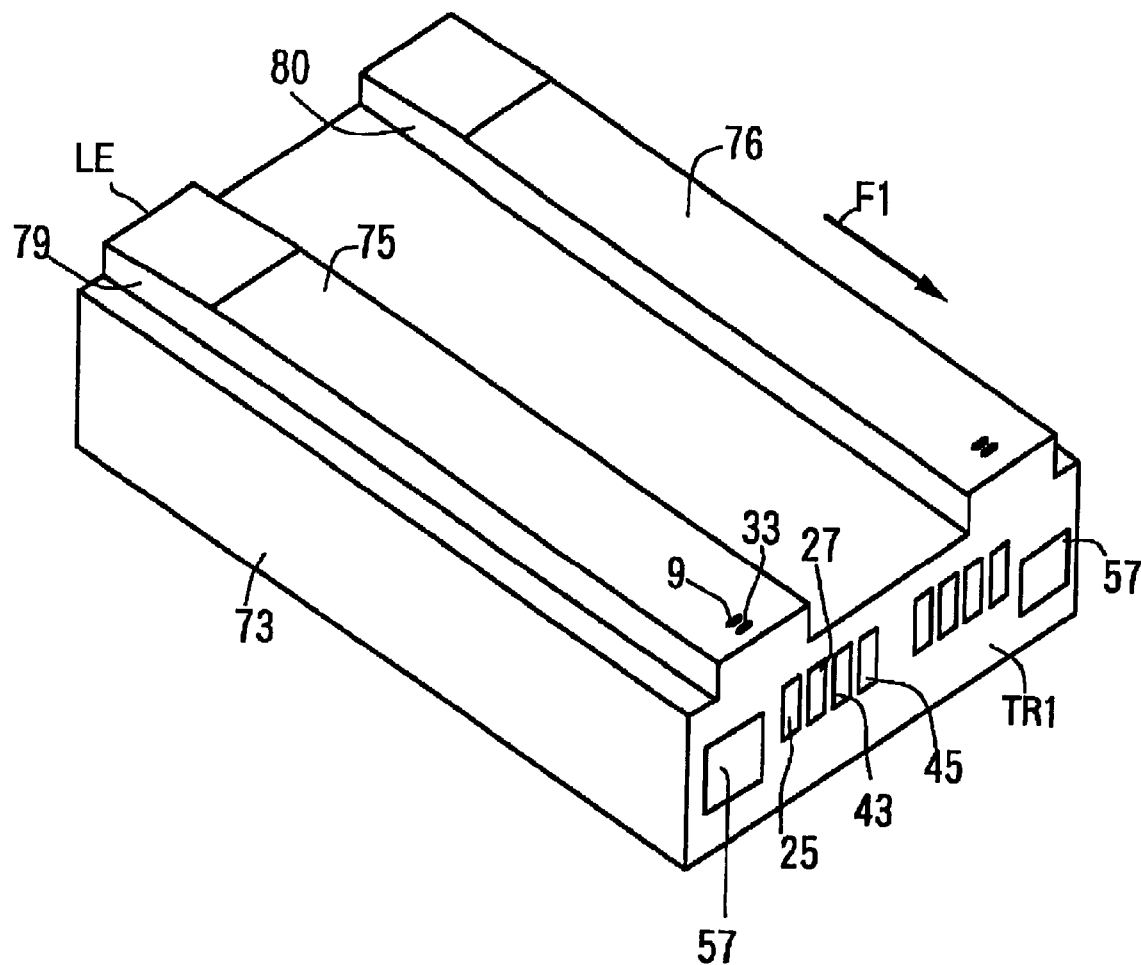
FIG. 8 is a perspective view showing an example in the thin film magnetic head of the present invention.

FIG. 8 is a perspective view showing an example of the thin film magnetic head of the present invention. The thin film magnetic head is obtained by cutting out the bar-shaped head aggregation shown in FIG. 2 into each thin film magnetic head element A1 to A5, and has the magnetoresistive effective elements 9 and the inductive type electromagnetic conversion elements 33 which are included in the bar-shaped head aggregation. Therefore, the thin film magnetic head of the present invention exhibits the same effects in the bar-shaped head aggregation of the present invention. In FIG. 8, reference character F1 designates an air outflow direction.

Figure 9:
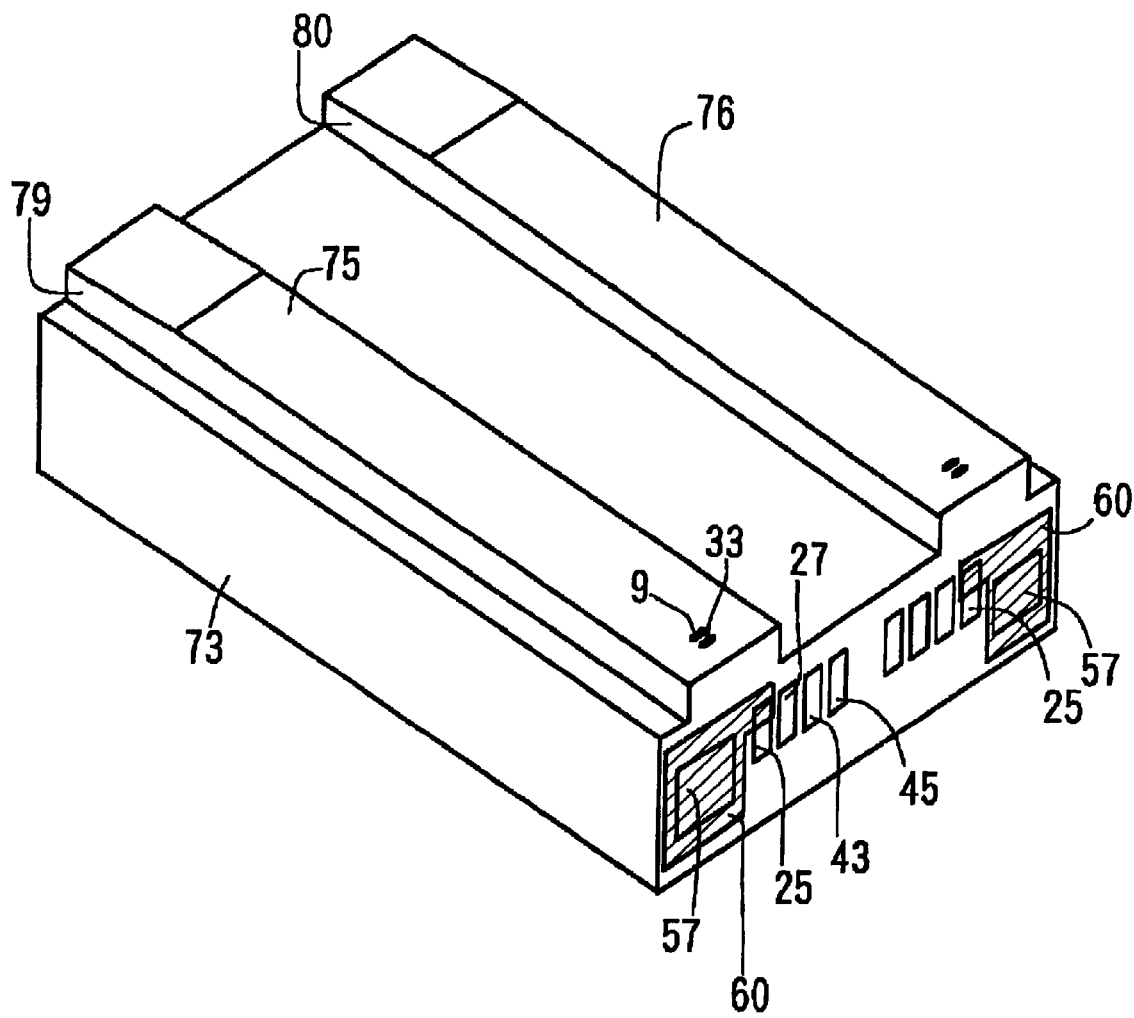
FIG. 9 is a perspective view showing an example in the magnetic head device of the present invention.

FIG. 9 is a perspective view showing another example of the thin film magnetic head of the present invention. In this example, the conductive films 60 to electrically connect the measuring terminal conductors 57 and the terminal conductors 25, respectively, are applied on the surface of the thin film magnetic head to which the terminal conductors 25 and 57 are exposed. Therefore, the first and the second insulating films 71 and 72 are prevented from being electrically damaged in processes except the electrical insulation measurement for the films 71 and 72. In this example, the conductive films 60 are patterned so as to expose the parts of the terminal conductors 25, respectively. Therefore, the probe can be directly connected to the terminal conductor 25 through the exposed part thereof.

Moreover, if the resistance of each conductive film 60 is set to an enough value, for example, 10 kΩ or over, not to influence the reproducing properties of the thin film magnetic head, the performance of the magnetoresistive effective type thin film magnetic head can be maintained and the electrical damage in the first and the second insulating films 71 and 72 can be avoided. Therefore, in this case, the conductive film 60 are not required to be removed, and thus, the thin film magnetic head with the conductive films 60 can be installed into a magnetic disk driving device. In this case, it is desired that the conductive films 60 may be made of a unsoluble material, not soluble material, for an organic solvent to be used in the manufacturing processes. Each conductive film 60 may be formed by a film-forming process not using a plasma such as metal CVD or evaporation, besides the applying.

Figure 10:
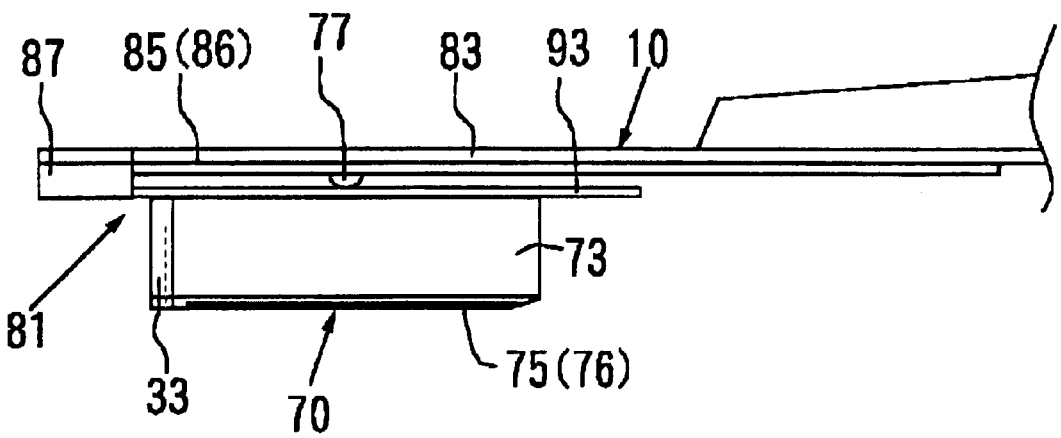
FIG. 10 is an elevational view showing a part of the magnetic head device of the magnetic head shown in FIG. 9.
Figure 11:
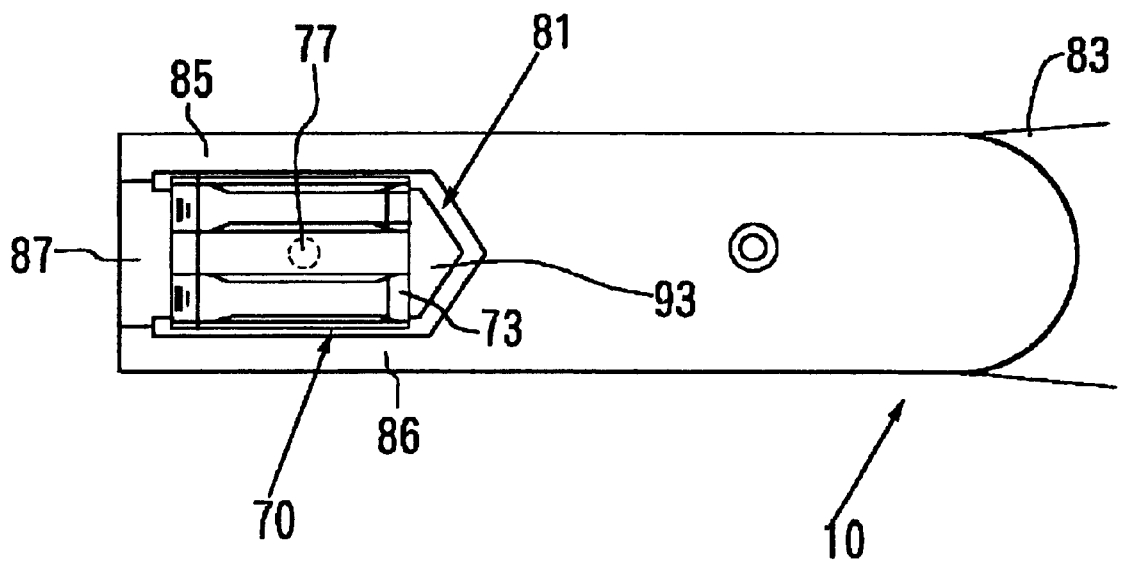
FIG. 11 is a bottom plan view of the magnetic head device.

FIG. 10 is a plan view showing a part of a magnetic head device according to the present invention, and FIG. 11 is a bottom plan view of the magnetic head device shown in FIG. 9. The magnetic head device has a head supporting apparatus 10 and a thin film magnetic head 70 according to the present invention similar to the ones in FIGS. 1–8.

The head supporting apparatus 10 supports the thin film magnetic head 70. The head supporting apparatus 10 is composed of a supporter 83 made of metallic plate and a flexibler 81 made of metallic plate provided on the free edge of the supporter 83 in its longitudinal direction. The thin film magnetic head 70 is provided on the lower surface of the flexibler 81.

The flexibler 81 has two outerframes 85 and 86 substantially parallel to the supporter 83 in its longitudinal direction, a lateral frame 87 to join the outerframes 85 and 86 in the remote portion thereof from the supporter 83, and a tongue shaped member 93, of which forefront is free, extending substantially parallel to the outerframes 85 and 86 from the almost central portion of the lateral frame 87.

On the almost central portion of the tongue shaped member 93 is provided a hemisheric loading convex portion 77 bulging on the supporter 83. The loading convex portion 77 conducts a load to the tongue shaped member 93 from the free edge of the supporter 83.

The thin film magnetic head 70 is attached to the lower surface of the tongue shaped member 93 by an adhesive agent, etc. Moreover, the thin film magnetic head 70 is provided so that the air outflow side TR1 can correspond to the longitudinal direction of the lateral frame 87 and its longitudinal direction can correspond to that of the head supporting apparatus 10. In this invention, any kind of head supporting apparatus may be employed, besides the above head supporting apparatus 10.

Since the above magnetic head device includes the thin film magnetic head 70 of the present invention, if necessary, the electrical insulation measurement for the insulating film with the embedded magnetoresistive effective element therein between the shielding films can be easily carried out. In this case, as mentioned above, the shielding films, the magnetoresistive effective element and the air bearing surfaces are not damaged.

The thin film magnetic head 70 of the magnetic head device may have applied conductive films to electrically connect the measuring terminal conductors 57 and the terminal conductors 25 (or 27), respectively, on its surface to which the terminal conductors 25 and 57 are exposed. In this case, the first and the second insulating films 71 and 72 are prevented from being electrically damaged in the processes except the electrical insulation measurement for the films 71 and 72, such as a fabricating process, an aftertreatment process, an operation process or a conveyance process. The conductive films can be easily removed by an organic solvent in the electrical insulation measurement for the first and the second insulating films 71 and 72.

Figure 12:
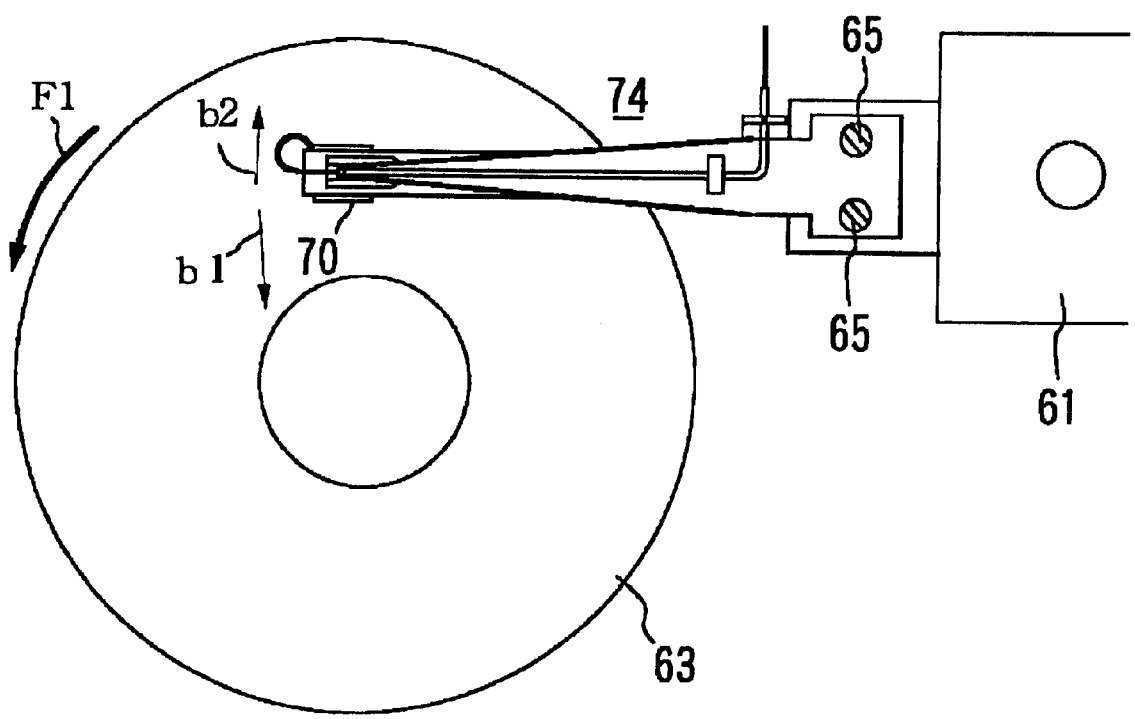
FIG. 12 is a plan view showing an example of the magnetic disk driving device of the present invention.

FIG. 12 is a plan view showing a magnetic disk driving device using a magnetic head device according to the present invention. The magnetic disk driving device has a magnetic head device 74 and at least one magnetic disk 63.

The magnetic head device 74 is similar to the one shown in FIGS. 9 and 10, and has a similar thin film magnetic head to the one shown in FIGS. 1–4 according to the present invention. The magnetic head device 74 is mounted on a position determining device 61 by a joining means 65 for the base portion of the supporter 10.

The magnetic head device 74 magnetically write for and read from the magnetic disk 63. Concretely, the magnetic disk 63 is rotated at a high velocity in a F1 arrow direction by a not shown driving device. This high velocity rotation generates a buoyant force for the thin film magnetic head 70 supported by the flexibler 81, and thereby, floats the thin film magnetic head 70 by a minute space (floating space). The position determining device 61 moves the thin film magnetic head 70 on the magnetic disk 63 so that the magnetic head 70 can seek the tracks of the magnetic disk 63 in the b1 direction or the b2 direction, and write/read information for and from the magnetic disk 63.

Since the above magnetic disk driving device includes the magnetic head device 74 with the thin film magnetic head 70 of the present invention, if necessary, the electrical insulation measurement for the insulating film with the embedded magnetoresistive effective element therein between the shielding films can be easily carried out. In this case, as mentioned above, the shielding films, the magnetoresistive effective element and the air bearing surfaces are not damaged.

As mentioned above, this invention can provide the following effects:

(a) A bar-shaped head aggregation, a thin film magnetic head, a magnetic head device with the thin film magnetic head and a magnetic disk driving device in which an electrical insulation of an insulating film, between shielding films, with an embedded magnetoresistive effective element film therein can be easily examined can be provided.

(b) A bar-shaped head aggregation, a thin film magnetic head, a magnetic head device with the thin film magnetic head and a magnetic disk driving device in which shielding films, a magnetoresistive effective element and an air bearing surface can not be damaged in the electrical insulation measurement for the insulating film, between the shielding films, with the embedded magnetoresistive effective element therein can be provided.

(c) A bar-shaped head aggregation, a thin film magnetic head, a magnetic head device with the thin film magnetic head and a magnetic disk driving device in which an insulating film is prevented from being electrically damaged in processes except its electrical insulation measurement can be provided.

(d) A bar-shaped head aggregation, a thin film magnetic head, a magnetic head device with the thin film magnetic head and a magnetic disk driving device in which a means to prevent the electrical damage for an insulating film can be easily removed in its electrical insulation measurement can be provided.

What is claimed is:

1. A bar-shaped head aggregation comprising aligned plural thin film magnetic head elements, each thin film magnetic head element having at least one electromagnetic conversion element, the electromagnetic conversion element including a first shielding film, a first insulating film, a magnetoresistive effective element, a first leading conductor film, a second leading conductor film, a second insulating film, a second shielding film, a first terminal conductor for the first leading conductor film, a second terminal conductor for the second leading conductor film and a terminal conductor for measurement of insulation resistance between the magnetoresistive effective element and the first and second shielding films, the first insulating film being provided on the first shielding film, the magnetoresistive effective element being provided on the first insulating film, the first leading conductor film being provided on the first insulating film and connected to one end of the magnetoresistive effective element, the second leading conductor film being provided on the first insulating film and connected to the other end of the magnetoresistive effective element, the first terminal conductor being connected to the first leading conductor film and exposed to a different surface of a slider from a medium opposing surface thereof, the second terminal conductor being connected to the second leading conductor film and exposed to a different surface of the slider from the medium opposing surface thereof, the second insulating film covering the first leading conductor film, the second leading conductor film and the magnetoresistive effective element, the second shielding film being provided on the second insulating film, the terminal conductor for measurement being conductively connected to at least one of the first and the second shielding films and exposed to a different surface of the slider from the medium opposing surface thereof.

2. A bar-shaped head aggregation as defined in claim 1, wherein a conductive film to electrically connect the terminal conductor for measurement and at least one of the first and the second terminal conductors is provided on the surface of the slider to which the terminal conductor for measurement and the first and the second terminal conductors are exposed.

3. A bar-shaped head aggregation as defined in claim 2, wherein the conductive film is made of a soluble material for an organic solvent.

4. A bar-shaped head aggregation as defined in claim 2, wherein the conductive film is made of an unsoluble material for an organic solvent.

5. A bar-shaped head aggregation as defined in claim 4, wherein the conductive film having resistivity or resistance as not to influence the detection of polished amount in the polish amount detection by a resistance measuring method in a lapping process.

6. A bar-shaped head aggregation as defined in claim 1, wherein the magnetoresistive effective element has a spin valve film-structure.

7. A bar-shaped head aggregation as defined in claim 1, wherein the magnetoresistive effective element is composed of a giant magnetoresistive effective element with a perovskite type magnetic substance.

8. A bar-shaped head aggregation as defined in claim 1, wherein the magnetoresistive effective element is composed of a ferromagnetic tunnel junction element.

9. A bar-shaped head aggregation as defined in claim 1, wherein each thin film magnetic head element has an inductive type electromagnetic conversion element.

10. A bar-shaped head aggregation as defined in claim 9, wherein the inductive type electromagnetic conversion element completes a magnetic circuit with a part of the second shielding film.

11. A thin film magnetic head comprising a slider and at least one electromagnetic conversion element, the electromagnetic conversion element including a first shielding film, a first insulating film, a magnetoresistive effective element, a first leading conductor film, a second leading conductor film, a second insulating film, a second shielding film, a first terminal conductor for the first leading conductor film, a second terminal conductor for the second leading conductor film and a terminal conductor for measurement of insulation resistance between the magnetoresistive effective element and the first and second shielding films, the first insulating film being provided on the first shielding film, the magnetoresistive effective element being provided on the first insulating film, the first leading conductor film being provided on the first insulating film and connected to one end of the magnetoresistive effective element, the second leading conductor film being provided on the first insulating film and connected to the other end of the magnetoresistive effective element, the first terminal conductor being connected to the first leading conductor film and exposed to a different surface of the slider from a medium opposing surface thereof, the second terminal conductor being connected to the second leading conductor film and exposed to a different surface of the slider from the medium opposing surface thereof;

the second insulating film covering the first leading conductor film, the second leading conductor film and the magnetoresistive effective element, the second shielding film being provided on the second insulating film, the terminal conductor for measurement being conductively connected to at least one of the first and the second shielding films and exposed to a different surface of the slider from the medium opposing surface thereof.

12. A thin film magnetic head as defined in claim 11, wherein the terminal conductor for measurement is exposed to the surface of the slider in an air outflow side.

13. A thin film magnetic head as defined in claim 11, wherein a conductive film to electrically connect the terminal conductor for measurement and at least one of the first and the second terminal conductors is provided on the surface of the slider to which the terminal conductor for measurement and the first and the second terminal conductors are exposed.

14. A thin film magnetic head as defined in claim 13, wherein the conductive film is made of a soluble material for an organic solvent.

15. A thin film magnetic head as defined in claim 13, wherein the conductive film having resistance as not to influence the reproducing performance of the thin film magnetic head.

16. A thin film magnetic head as defined in claim 15, wherein the conductive film has a resistance with 10 kΩ or over.

17. A thin film magnetic head as defined in claim 11, wherein the magnetoresistive effective element has a spin valve film-structure.

18. A thin film magnetic head as defined in claim 11, wherein the magnetoresistive effective element is composed of a giant magnetoresistive effective element with a perovskite type magnetic substance.

19. A thin film magnetic head as defined in claim 11, wherein the magnetoresistive effective element is composed of a ferromagnetic tunnel junction element.

20. A thin film magnetic head as defined in claim 11, wherein an inductive type electromagnetic conversion element is included.

21. A thin film magnetic head as defined in claim 20, wherein the inductive type electromagnetic conversion element completes a magnetic circuit with a part of the second shielding film.

22. A magnetic head device comprising a thin film magnetic head as defined in claim 11, and a head supporting apparatus to support the thin film magnetic head.

23. A magnetic disk driving device comprising a magnetic head device as defined in claim 22 and at least one magnetic disk which is magnetically written/read by the magnetic head device.

* * * * *